United States Patent [19]

Bottelson

[11] 4,400,672
[45] Aug. 23, 1983

[54] RELAY MOUNTING DEVICE

[75] Inventor: Thomas J. Bottelson, Baraboo, Wis.

[73] Assignee: Gulf & Western Manufacturing Company, Southfield, Mich.

[21] Appl. No.: 296,981

[22] Filed: Aug. 27, 1981

[51] Int. Cl.³ ............................................. H01H 45/04
[52] U.S. Cl. ........................................ 335/202; 200/296; 361/391
[58] Field of Search ............... 361/391, 335; 248/27.1, 248/27.3; 200/295, 296; 335/202

[56] References Cited

U.S. PATENT DOCUMENTS 4,139,755  2/1979  Hastings et al. ............... 200/296
4,287,764  9/1981  Staab et al. ..................... 361/391

FOREIGN PATENT DOCUMENTS 2389214 12/1978  France ........................... 200/295

Primary Examiner—Harold Broome
Attorney, Agent, or Firm—Body, Vickers & Daniels

[57] ABSTRACT

A relay mounting device for securing a relay having a front face, with visual or manipulative components thereon, onto a support panel having a front surface, a parallel rear surface and an access opening therethrough. This device comprises a unitary body with a bezel portion adapted to engage the front surface of the panel and defining a central opening, a relay supporting cradle depending from the bezel portion and adapted to extend through the panel access opening wherein the cradle defines a relay receiving nest and means for fastening the body onto the panel with the central opening of the body exposing the relay receiving nest at the front surface of the panel whereby a relay supported in the nest will have its front face exposed for observation and/or manipulation.

19 Claims, 8 Drawing Figures

RELAY MOUNTING DEVICE

The present invention relates to electromechanical relays of the type having visual or manipulative components on the front face thereof, such as shown in U.S. Pat. No. 4,097,832 and more particularly to a device for mounting such relays.

BACKGROUND OF THE INVENTION

The present invention is particularly applicable for use in mounting a standard electromechanical relay onto the door or wall of a cabinet used to house electrical equipment, including relays, and it will be described with particular reference thereto; however, it is appreciated that the invention has broader applications and may be used to mount standard electromechanical relays onto various panels.

In controlling industrial equipment, it is common practice to employ a large number of electromechanical relays which are generally packaged to have substantially uniform outer dimensions. At least, a line of relays of a particular manufacturer will have relative standardized outer dimensions. Such relays have internal coils, a base with prongs to plug into an electrical circuit and internal magnetically actuated components to shift the electrical condition between the various connector prongs at the base of the relay. These electromechanical relays are generally mounted on a rack or support structure located within a cabinet having an access door. Since a large number of these relays are closely positioned within the cabinet or enclosure, access to the relays is not always convenient. This assembly arrangement for relays is widely used and is quite acceptable, except when certain relays have visual indicators or manipulative components on the relay itself. For instance, it is quite common to provide relays with a rheostat which is adjustable at the outer surface or face of the relay. In addition, some relays have lights to indicate whether or not the relay is energized. Other relays have a counting feature which includes digit setting units on the relay itself. Other relays have latching pins, such as shown in U.S. Pat. No. 4,097,832. As can be seen from this general summary, electromechanical relays are becoming more complex and include components manually adjustable at the relay itself so that circuit characteristics can be modified without changing components or without adding additional components to the previously assembled circuitry. Using relays of the type having a visual or manipulative component on a face thereof, the maintenance or engineering personnel had to gain access to the cabinet or enclosure for making observations with respect to certain relay conditions and for changing the electrical characteristics or parameters of the various relays. These cabinets are often located in close quarters and in environments which are not optimum for relays and other electrical components within the enclosure or cabinet. Thus, the tediousness and inconvenience of making observations and adjustments at the various relays within a cabinet has been a hindrance to using the more complex relays. This is even more disadvantageous when only a limited number of relays need attention. To overcome this difficulty, some companies have tapped into the various relays and wired the control devices onto the door of the cabinet or enclosure. In some instances, a rheostat is fixed to the door and leads are directed from the rheostat to a particular relay mounted within the cabinet so that the rheostat for controlling functions of the relay is removed from the relay itself and placed on the door or cabinet wall. This modification of the existing relay is expensive. It involves modification of a relay. The long leads often require shielding and have resulted in certain noise interference. By bringing the rheostat to the door for external manipulation, a standard available relay with an internal rheostat is not used. The same remote connection concept has been employed for wiring indicator lights on the door and connecting the lights to the internal circuitry. Although rheostats and indicator lights can be wired remotely for controlling the circuitry involving certain relays, this arrangement for changing the condition of the various relays is not acceptable for certain functions. For instance, a mechanical latch which is available on some relays could not be remotely connected in this fashion. In addition, thumb wheels of digital circuits require a great number of wires which must be directed from the relay to the remote location on the door of the cabinet if external manipulation is to be provided without opening the cabinet or enclosure. In summary, certain relays, which are to be provided with visual or manipulative components, can be assembled at the job site by external wiring. Such external wiring cannot be used universally for various relays having such visual and manipulative features. For that reason, such external wiring still does not negate the necessity for setting certain relays which are in the cabinet and cannot use complicated remote wiring. It is, therefore, still the general practice to use relays specifically provided with visual and manipulative features on the face thereof within the cabinet itself and which can be observed and adjusted only by obtaining access to the interior of the enclosure or cabinet.

THE INVENTION

The present invention relates to a mounting device which overcomes the disadvantages of requiring access to the electrical relay enclosure for day-to-day manipulation or observation of standard relays having visual and/or manipulative components secured thereon. By using the invention, standard relays can be employed with an enclosure for an electrical control system without requiring access to the cabinet for each minor modification or observation of the various mechanical relays in the cabinet.

In accordance with the invention, there is provided an adaptor which allows a standard relay with a visual or manipulative component on the face thereof to be mounted on the wall or door of a cabinet so that the visual and manipulative components are visible from the outside of the cabinet. This adaptor is universal and can be used with a wide variety of electromechanical relays so that various adjusting features of electromechanical relays on a relay itself can be obtained by purchasing a shelf-item relay and using the adaptor to mount this relay in an exposed manner on the wall or door of the electrical cabinet.

In accordance with the present invention, there is provided a mounting device or adaptor for a relay having a front face with visual or manipulative components. This device mounts a standard relay onto a support panel such as a wall or door having a front surface, a parallel rear surface and an access opening for receiving the mounting device. This device comprises a unitary body having a bezel portion adapted to engage the front surface of the support panel and defining a central opening, a relay supporting cradle depending from the bezel portion and adapted to extend through the access opening in a direction from the front surface of the panel wherein the cradle defines a relay receiving nest and includes means for releasably receiving and retaining a relay. This device or adaptor includes means for fastening the unitary body onto the panel with the central opening exposing the relay receiving nest at the front surface of a panel whereby the face of the relay is exposed at the front surface. In this manner, the visual components may be observed from outside the electrical cabinet. Also, manual manipulation of components on a standard relay can be made from outside the cabinet without requiring remote location between the manipulative component and the relay itself.

In accordance with another aspect of the present invention, there is a transparent door and means for mounting this door onto the unitary body of the adaptor for movement between a first position covering the central opening and a second position exposing the relay at the central opening. In this manner, the plastic door can close the central opening of the unitary body to prevent environmental exposure of the relay itself and possibly the interior of the electrical cabinet.

The primary object of the present invention is the provision of an adaptor or mounting device for mounting a standard relay with visual and/or manipulative components onto a wall panel or door panel of an elecrical cabinet.

Still a further object of the present invention is the provision of an adaptor, as defined above, which adaptor will receive standardized relays and expose at least the face of the relay containing visual and/or manipulative components to the exterior of the cabinet.

Yet another object of the present invention is the provision of an adaptor which is generally universal and which will accept several different types of generally standardized relays.

Yet a further object of the present invention is the provision of an adaptor, as defined above, which adaptor overcomes the necessity of mounting certain relay control components separately at a remote position with respect to the relay.

These and other objects and advantages of the present invention will become apparent from the following description taken together with certain drawings.

BRIEF DESCRIPTION OF THE DRAWINGS

In the disclosure, the following drawings are employed.

PREFERRED EMBODIMENT

Figure 1:
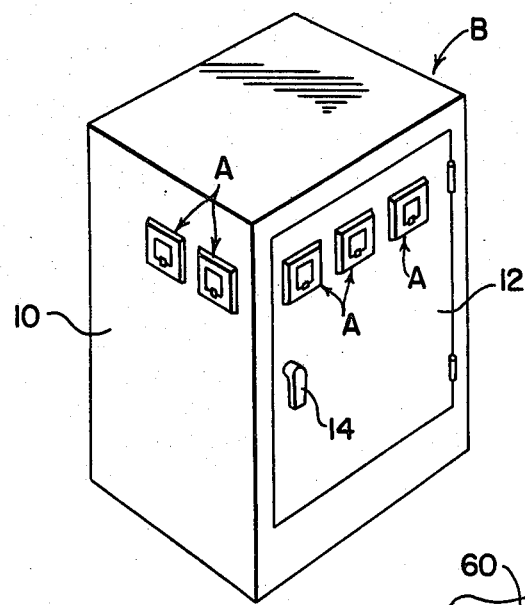
FIG. 1 is a pictorial view showing an electrical cabinet of the type containing standardized relays and employing the preferred embodiment of the present invention.
Figure 2:
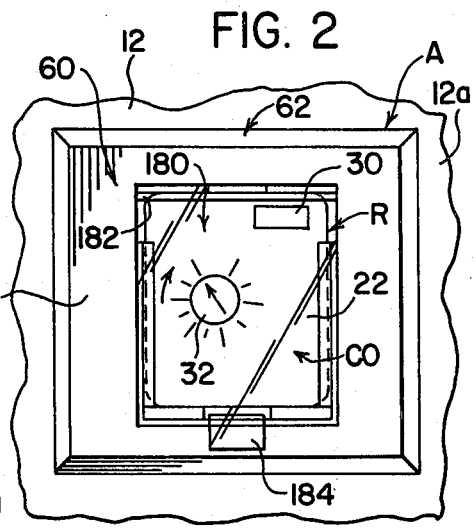
FIGS. 2, 3 and 4 are enlarged partial views of adaptors constructed in accordance with the present invention, as shown in FIG. 1.
Figure 3:
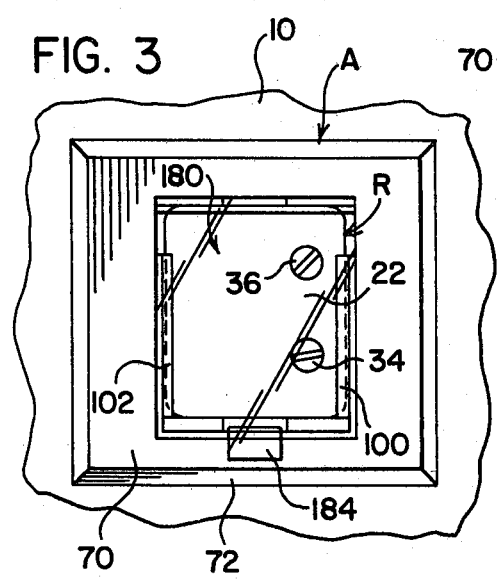
Figure 4:
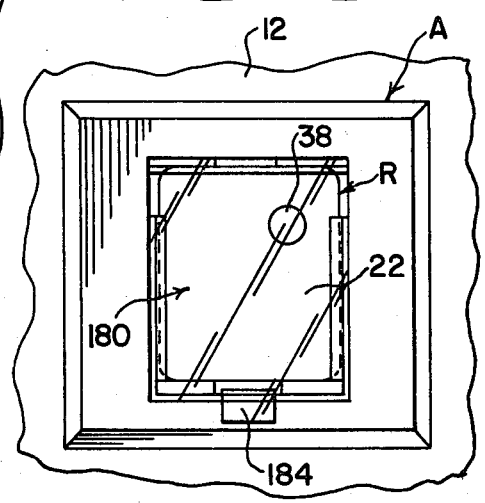
Figure 5:
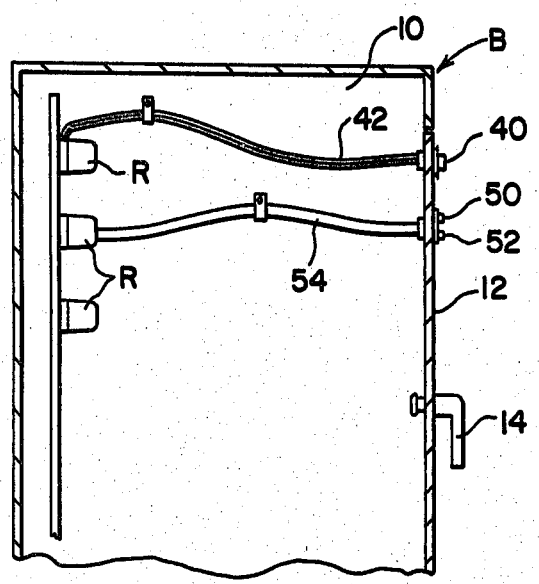
FIG. 5 is a partially cross-sectional view showing an electrical cabinet and an arrangement used for mounting relay controlling components remotely of the relays.

Referring now to the drawings wherein the showings are for the purpose of illustrating a preferred embodiment of the invention only, and not for the purpose of limiting same, FIG. 1 shows a series of adaptors A constructed in accordance with the present invention and supported on the external surface of an electrical cabinet B on either a wall panel 10 or a door panel 12. Door panel 12 has a handle 14 manipulated to open door 12 for gaining access to the interior of electrical cabinet B. Standardized relays R are mounted within cabinet B. These relays include interior coils and magnetically actuated components to control the electrical circuits between a variety of external prongs 20 on the relays. This type of relay, which is a shelf-item, includes a front or top face 22 having mounted thereon any number of various visual and/or manipulative components. The term front face shall be used to mean any surface which can face in a certain direction when relay R is mounted. As illustrated in FIG. 2, the component can be an indicator light 30 or a rheostat 32. As shown in FIG. 3, two digit adjusting screws 34, 36 can be used as the components to change digital information when relay R is used in conjunction with a digital counting concept. In a like manner, a reset plunger 38, shown in FIG. 4, can be employed as the visual and/or manipulative component on face 22 of relay R. As can be seen, standardized relay R can be provided with various components which require attention by an operator or engineer during use of the relay in a circuit. The term standardized means that relays R can be manufactured by a given company with a given outer dimension and with or without the various components. As background information, FIG. 5 illustrates a known arrangement where a relay R is used with a remote rheostat 40 mounted on door 12 and connected to the door by elongated leads 42. In a like manner, digit adjusting screws 50, 52 could be mounted on the door and interconnected with a circuit associated with another relay R by a plurality of leads 54. This arrangement for providing remote, external adjustment of relays R within cabinet B has been suggested as a means for allowing external control of relays R. The present invention overcomes the obvious disadvantages of the concept shown in FIG. 5 by using adaptor A to mount standardized relays R with the components on face 22 exposed externally for manipulation and observation.

Figure 6:
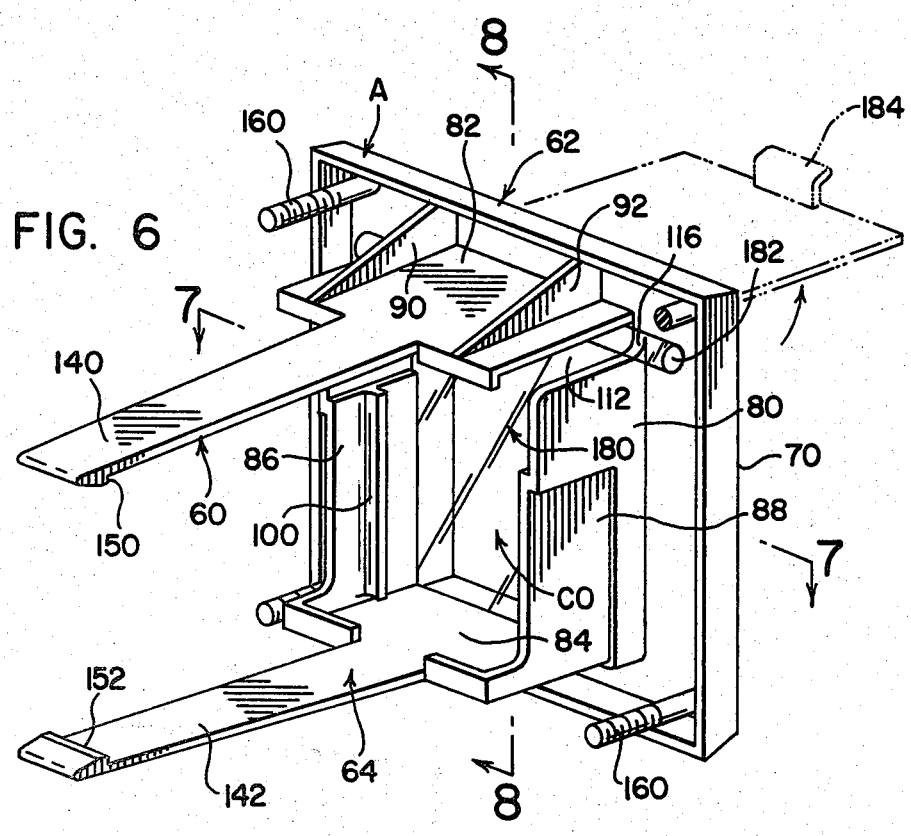
FIG. 6 is a pictorial view of the preferred embodiment of the present invention.
Figure 7:
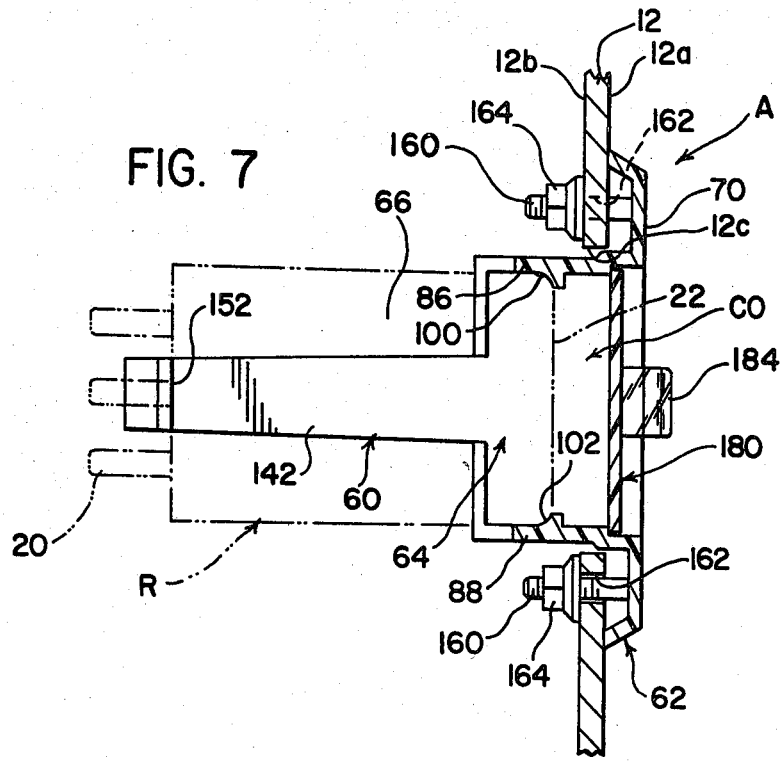
FIG. 7 is a sectional view taken generally along line 7—7 of FIG. 6.

As mentioned before, the external components on face 22 can vary. For the purposes of illustration, FIG. 2 having light 30 and rheostat 32 is discussed with the detailed disclosure of adaptor A in FIGS. 6–8. This same adaptor A is used for the other relays R to be mounted on an exposed panel of cabinet B, as shown in FIG. 1. Adaptor A includes a unitary plastic body 60 having an external bezel portion 62 and a rearwardly extending cradle portion 64 which defines an internal nest 66 dimensioned to receive standardized relays R. These relays need not be modified and can be mounted in a standard rack fashion within cabinet B or in an arrangement using adaptor A. Of course, it may be necessary to slightly modify the outer structure of relay R; however, this adaptation will not prevent the relay R from being used in a normal fashion by mounting on an internal rack. Thus, relay R is a shelf-item and adaptor A utilizes this shelf-item relay to mount the relay for external exposure through a panel, such as wall 10 or door 12.

Figure 8:
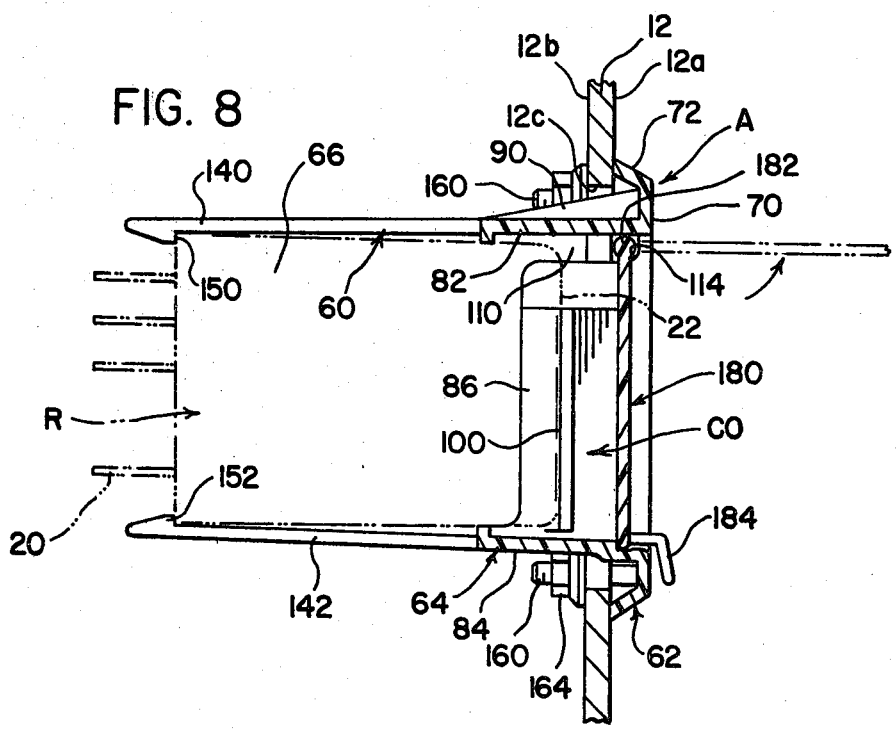
FIG. 8 is a cross-sectional view taken generally along line 8—8 of FIG. 6.

Bezel 62 is a generally square structure defined by forward facing wall 70 having an end 72 adapted to taper outwardly from wall 70 and engage the front surface 12a of door or panel 12. This panel also has a rear surface 12b parallel to surface 12a and an access opening 12c through which the rearwardly extending cradle 64 of adaptor A extends when the adaptor is mounted on panel 12. Opening 12c may be circular, rectangular, etc. Cradle 64, in the preferred embodiment, includes a box 80 formed from upstanding walls or partitions 82, 84, 86 and 88 generally surrounding internal nest 66 and adapted to receive the front end of relay R. Reinforcing ribs 90, 92 are provided on wall 82 which is separated from walls 86, 88 by slots 110, 112. Arcuate portions 114, 116 are provided at the inwardmost ends of slots 110, 112 for a purpose to be described later. Walls 86, 88 are provided with inwardly extending abutment means or ribs 100, 102 adapted to engage the forward or front end of relay R to expose the face 22 of relay R through central opening CO defined by walls 82-88. In this fashion, face 22 is exposed through panel 12 and is located inwardly of adaptor A by engaging inwardly extending ribs 100, 102. Inwardly extending, resilient or flexible arms 140, 142 have inwardly facing shoulders or detents 150, 152 adapted to engage the rear end of relay R so that prongs 20 thereon extend outwardly and are adapted to be connected by wiring or sockets with the electrical circuitry in which relay R is employed. Relay R is supported between second abutment means formed by shoulders 150, 152 and first abutment means formed by ribs 100, 102, which abutment means are spaced from each other a distance generally corresponding to the vertical height of relay R. Thus, this spacing is adjusted for the particular series of relays R manufactured by a certain company. Adaptor A is universal to the extent that any of the various relays R having this nominal height can be captured within nest 66 and held there between ribs 100, 102 and detents or shoulders 150, 152. Studs 160 extend from wall 70 through openings 162 in panel 12 and are used to secure adaptor A in place by a plurality of locked nuts 164. The adaptor extends through opening 12c and is mounted on panel 12. Thereafter, a relay is snapped into nest 66. This is allowed by the resilient characteristics of arms 140, 142. A transparent pivotally mounted door 180 includes an upper generally cylindrical hanger or bar 182 which extends laterally from the door to define pins which are received in slots 110, 112 and against arcuate portions 114, 116. After adaptor A is assembled onto the panel 12, bar 182 extends outwardly from box 80 to be engaged by surface 12a to capture door 180 between panel 12 and bezel portion 62. This feature is shown in FIG. 8. An appropriate handle 184 allows pivotal movement of door 180 from the closed position, shown in solid lines in FIG. 6-8, to the open position, shown in phantom lines in FIG. 6. When door 180 is pivoted open to expose the various components on face 22, these components can be manually adjusted externally of cabinet B. As can be seen, the adaptor could employ any one of the various relays R for the purpose of converting the relay from a rack-mounted relay to a panel-mounted relay, which concept is useful when external components must be observed or manipulated to control the function of the relay.

Having thus described the invention, the following is claimed:

1. A relay mounting device for securing a relay having a front face with visual or manipulative components onto a support panel having a front surface, a parallel rear surface and an access opening through the panel for receiving said mounting device, said device comprising: a unitary plastic body having a bezel portion overlying and engaging said front surface of said panel around said access opening and defining a central opening, a relay supporting cradle depending from said bezel portion and extending through said access opening in a direction from said front surface to said rear surface with said bezel and cradle leaving said access opening substantially unobstructed, said cradle defining a relay receiving nest, and fastening means on said bezel and extending through portions of said panel bordering the access opening therein and fixedly securing said body onto said panel with said central opening exposing, through said unobstructed access opening, said relay receiving nest at said front surface; said supporting cradle including a first abutment means adjacent said bezel, a second abutment means spaced away from said bezel, said first and second abutment means generally defining said relay receiving nest, and means for holding said relay in said nest between said first and second abutment means with said front face exposed through said panel by said unobstructed central opening.

2. A device as defined in claim 1 wherein said holding means includes means for allowing said relay to be releasably held in said nest.

3. A device as defined in claim 2 wherein said second abutment means are two shoulders spaced across said nest in a direction generally parallel to said rear surface of said panel when said device is assembled into said panel.

4. A device as defined in claim 3 wherein said releasable holding means includes two spaced, flexible arms with outboard ends with one of said shoulders secured to the outboard end of each of said arms.

5. A device as defined in claim 4 wherein said first abutment means is spaced from said bezel a distance to space said nest behind said panel when said mounting device is mounted on said panel.

6. A device as defined in claim 3 wherein said first abutment means is spaced from said bezel a distance to space said nest behind said panel when said mounting device is mounted on said panel.

7. a device as defined in claim 1 wherein said first abutment means is spaced from said bezel a distance to space said nest behind said panel when said mounting device is mounted on said panel.

8. A device as defined in claim 1 wherein said second abutment means are two shoulders spaced across said nest in a direction generally parallel to said rear surface of said panel when said device is assembled into said panel.

9. A relay mounting device for securing a relay having a front face with visual or manipulative components onto a support panel having a front surface, a parallel rear surface and an access opening through the panel for receiving said mounting device, said device comprising: a unitary body having a bezel portion adapted to engage said front surface of said panel and defining a central opening, a relay supporting cradle depending from said bezel portion and adapted to extend through said access opening in a direction from said front surface to said rear surface, said cradle defining a relay receiving nest, and means for fastening said body onto said panel with said central opening exposing said relay receiving nest at said front surface; said supporting cradle including a first abutment means adjacent said bezel, a second abutment means spaced away from said bezel, said first and second abutment means generally defining said relay receiving nest, and means for holding said relay in said nest between said first and second abutment means with said front face exposed through said panel by said central opening, said holding means including means for allowing said relay to be releasably held in said nest, and said device further including a transparent door and means for mounting said door onto said unitary body for movement in at least a first position covering said central opening and a second position not covering said central opening.

10. A device as defined in claim 9 wherein said door mounting means includes means for pivotally mounting said door onto said unitary body.

11. A relay mounting device for securing a relay having a front face with visual or manipulative components onto a support panel having a front surface, a parallel rear surface and an access opening through the panel for receiving said mounting device, said device comprising: a unitary body having a bezel portion adapted to engage said front surface of said panel and defining a central opening, a relay supporting cradle depending from said bezel portion and adapted to extend through said access opening in a direction from said front surface to said rear surface, said cradle defining a relay receiving nest, means for fastening said body onto said panel with said central opening exposing said relay receiving nest at said front surface; said supporting cradle including a first abutment means adjacent said bezel, a second abutment means spaced away from said bezel, said first and second abutment means generally defining said relay receiving nest, and means for holding said relay in said nest between said first and second abutment means with said front face exposed through said panel by said central opening, said device further including a transparent door and means for mounting said door onto said unitary body for movement in at least a first position covering said central opening and a second position not covering said central opening.

12. A device as defined in claim 11 wherein said door mounting means includes means for pivotally mounting said door onto said unitary body.

13. A relay mounting device for securing a relay having a front face with visual or manipulative components onto a support panel having a front surface, a parallel rear surface and an access opening through the panel for receiving said mounting device, said device comprising: a unitary plastic body having a bezel portion overlying and engaging said front surface of said panel around said access opening and defining a central opening, a relay supporting cradle depending from said bezel portion and extending through said access opening in a direction from said front surface to said rear surface with said bezel and cradle leaving said access opening substantially unobstructed, said cradle defining a relay receiving nest and including means for releasably receiving a relay, and fastening means on said bezel portion and extending through portions of said panel bordering the access opening therein and fixedly securing said body onto said panel with said central opening exposing, through said unobstructed access opening, said relay receiving nest at said front surface whereby said front face of said relay is exposed to said front surface.

14. A relay mounting device for securing a relay having a front face with visual or manipulative components onto a support panel having a front surface, a parallel rear surface and an access opening through the panel for receiving said mounting device, said device comprising: a unitary body having a bezel portion adapted to engage said front surface of said panel and defining a central opening, a relay supporting cradle depending from said bezel portion and adapted to extend through said access opening in a direction from said front surface to said rear surface, said cradle defining a relay receiving nest and including means for releasably receiving a relay, and means for fastening said body onto said panel with said central opening exposing said relay receiving nest at said front surface whereby said front face of said relay is exposed to said front surface, said device further including a transparent door and means for mounting said door onto said unitary body for movement in at least a first position covering said central opening and a second position not covering said central opening.

15. A device as defined in claim 14 wherein said door mounting means includes means for pivotally mounting said door onto said unitary body.

16. A relay mounting device as defined in claim 13, wherein the said cradle is formed integrally with the said body and the bezel portion thereof as a single unit.

17. A relay mounting device for securing a relay having a front face with visual or manipulative components onto a support panel having a front surface, a parallel rear surface and an access opening through the panel for receiving said mounting device, said device comprising: a unitary plastic body comprising an open-ended rectangularly box-shaped cradle portion defining a relay receiving nest and a bezel flange portion extending laterally outward from and around said box-shaped portion at one of the open ends thereof, said body being mounted on said panel with the said bezel flange portion overlying and engaging said front surface of said panel around said access opening, and with only the said box-shaped cradle portion extending through said access opening and in relatively close fitting relation thereto so as to leave said access opening substantially unobstructed and expose said relay receiving nest at said front surface through said one open end of said box-shaped portion, and fastening means on said bezel flange portion extending through portions of said panel bordering the said access opening therein and fixedly securing said body onto said panel.

18. A relay mounting device as defined in claim 17, wherein said supporting cradle includes a first abutment means adjacent said bezel flange portion, a second abutment means spaced rearwardly from said first abutment means, said first and second abutment means generally defining said relay receiving nest, and means for holding a said relay in said nest between said first and second abutment means with the said front face of the relay exposed through said panel and said one open end of said cradle.

19. A relay mounting device as defined in claim 18, wherein said holding means includes means for allowing a said relay to be releasably held in said nest.

* * * * *